United States Patent [19]

Lissajoux et al.

[11] 4,455,887
[45] Jun. 26, 1984

[54] DEVICE TO CORRECT AN UNBALANCE OF THE ROTOR OF TURBINE ENGINES

[75] Inventors: Pierre J. Lissajoux, Saint Michel sur Orge; Marcel L. Rigo, Paray Vieille Poste, both of France

[73] Assignee: Societe Nationale d'Etude et de Construction de Moteurs d'Aviation, France

[21] Appl. No.: 347,543

[22] Filed: Feb. 10, 1982

[30] Foreign Application Priority Data

Feb. 11, 1981 [FR] France ............... 81 02632

[51] Int. Cl.³ ............... F16F 15/22; F16F 15/32
[52] U.S. Cl. ............... 74/573 R; 464/180
[58] Field of Search ............... 73/458, 468, 470; 74/572, 573 R; 464/178, 179, 180, 183, 184

[56] References Cited

U.S. PATENT DOCUMENTS

| 3,686,895 | 8/1972 | Easley | 464/180 |
| 3,776,065 | 12/1973 | Unno et al. | 74/573 R |
| 3,889,489 | 6/1975 | Casey et al. | 464/178 X |
| 4,059,972 | 11/1977 | Beam et al. | 464/180 X |
| 4,177,692 | 12/1979 | Irwin | 74/573 R |
| 4,318,280 | 3/1982 | Williams | 464/180 |

FOREIGN PATENT DOCUMENTS

| 1269838 | 1/1966 | Fed. Rep. of Germany. | |
| 1477752 | 3/1967 | France. | |
| 2272260 | 5/1975 | France. | |
| 1019519 | 2/1966 | United Kingdom | 73/470 |

Primary Examiner—Stuart S. Levy
Assistant Examiner—Daniel P. Stodola
Attorney, Agent, or Firm—Bacon & Thomas

[57] ABSTRACT

A device to correct unbalance of the rotor of a turbojet engine having a hollow shaft and a shaft bearing. The device being in the hollow shaft in the region of the bearing. The hollow shaft has internal flutes and a transverse wall. A balancing member in the hollow shaft has external flutes and a closed end adjacent the transverse wall and a head at its other end having an eccentric portion held in a selected angular position by engaging the external flutes of the balancing member with internal flutes in the shaft and then securing the closed end of the balancing member to the transverse wall.

8 Claims, 4 Drawing Figures

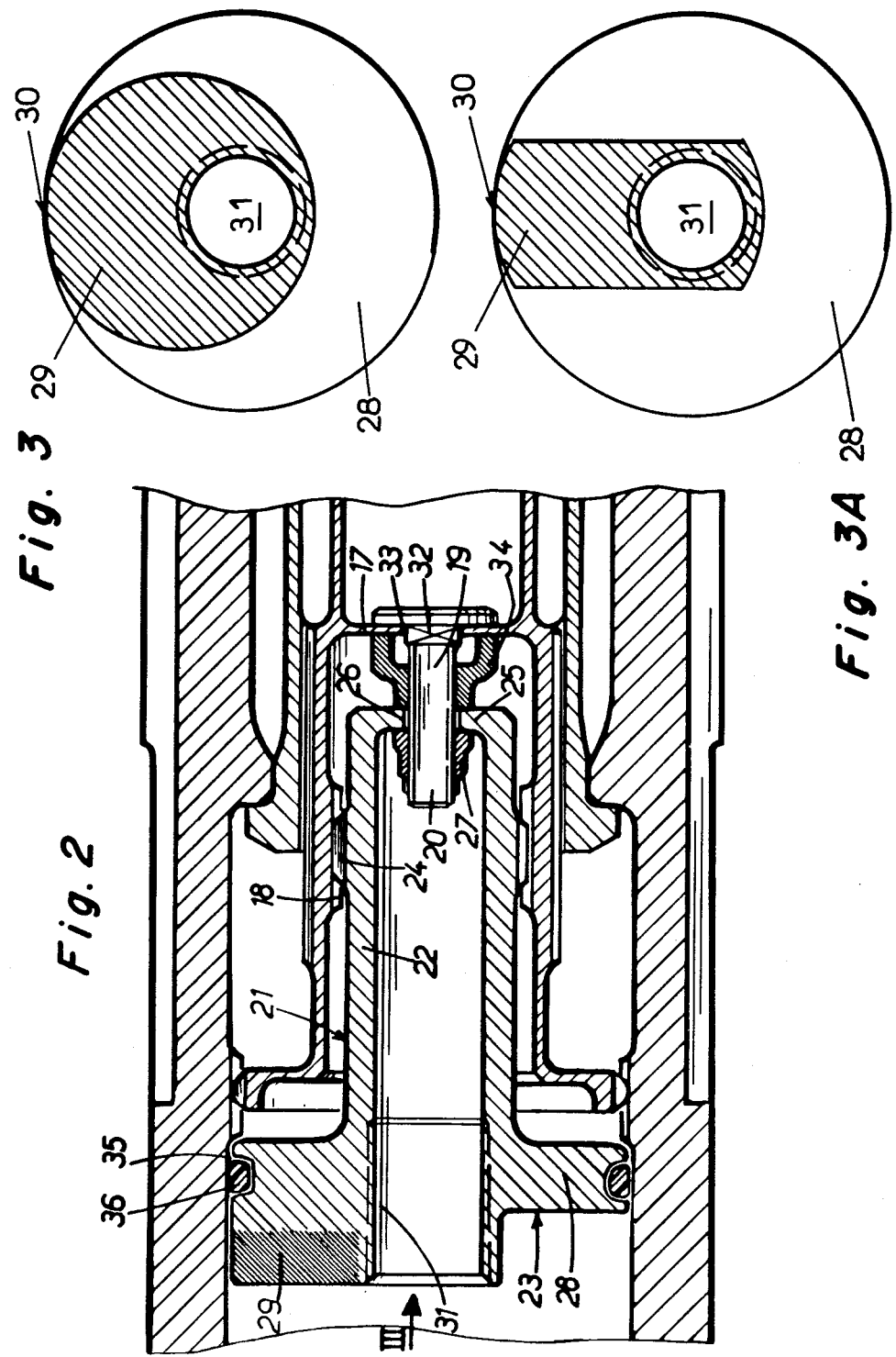

DEVICE TO CORRECT AN UNBALANCE OF THE ROTOR OF TURBINE ENGINES

BACKGROUND OF THE INVENTION

Rotating parts of turbine engines are generally balanced with care during their construction. It happens, however, that after the assembly of the different stages, residual moments are sufficient to produce slight deformations of the shaft in rotation. These deformations generate, at high velocities, vibrations and stresses which severly affect the life of the turbine engine.

The balancing of a body in motion is ordinarily effected by the removal or addition of a certain mass of material at a predetermined distance from the axis and in a definite radial direction.

French Pat. No. 2,272,260 proposes a device to correct the imbalance of a rotor disk consisting of a certain number of weights placed at the periphery of the disk against the rim into which a plurality of grooves are machined to maintain the roots of the blades. The balancing weights are present in the form of rectangular parallelepipeds, with one of the large faces thereof carrying a plurality of tongues. The tongues are located in radial grooves provided on the lateral faces of hooks coplanar with the radial face of the rim. The weights are maintained in the radial direction between the platform of the blades and an elastic ring, the ring being placed under the weights between the hooks and the face of the disk.

This device makes it possible to obtain exact balancing both in relation to value and to direction and to remove the blades when needed without encountering particular difficulties.

This disk by disk balancing permits, however, the existence at the level of the rotor bearings a residual unbalance of slight value, which may be determined with respect to magnitude and direction, for example, by the device described in French Pat. No. 1,477,752. This device comprises a box, which contains two weights in the form of coaxial, circular sectors, angularly movable with respect to each other. The box is introduced in the hollow shaft at the bearing. With the aid of means provided to rotate the weights in relation to each other or individually, it is possible to create an additional imbalance equal to the residual imbalance and to choose the direction of the additional imbalance to exactly compensate the residual unbalance. The adjustment is effected by means of a suitable tool assembly moving in the hollow shaft and by successive testing, by starting the jet engine. In this manner, a curve is established which makes it possible to determine the value of the balancing weight and its position. With the aid of these data, the definitive balancing process is effected by a conventional method, by adding or removing material to or from the periphery of the disk.

As the compensation is made in a plane relatively far from the bearing, the results are not as good as might be expected and vibrations, while reduced, are still appreciable at the bearings.

SUMMARY OF THE INVENTION

The present invention proposes to compensate for the residual imbalance as close as possible to the bearings and has as its object a correction device comprising, in the bore of the shaft, a plurality of peripheral flutes and a transverse wall fastening means secured directly or indirectly in the axis of the shaft and further carrying a balancing piece. The balancing piece consists of a hollow cylindrical body carrying on its external surface a plurality of flutings provided to cooperate with the flutings of the bore of the shaft and, at one end, a bottom having complementary fastening means cooperating with the fastening means carried on the transverse wall, and a head having a cylindrical part extending coaxially with the other end of the hollow cylindrical body and comprising a similar bore, with said cylindrical part of the head carrying an eccentric part, one of the dimensions whereof is at least equal to the sum of the radii of the cylindrical part and of the bore.

BRIEF DESCRIPTION OF THE DRAWINGS

An embodiment of the invention will appear more clearly from the explanations and figures presented hereinafter as an example.

FIG. 2 is a large scale sectional view of an embodiment of the correction device; and FIG. 3 is a view as seen from III, of the balancing piece of FIG. 2.

FIG. 3A is a view as seen from III of a second embodiment of the balancing piece in FIG. 2.

DESCRIPTION OF A PREFERRED EMBODIMENT

Figure 1:
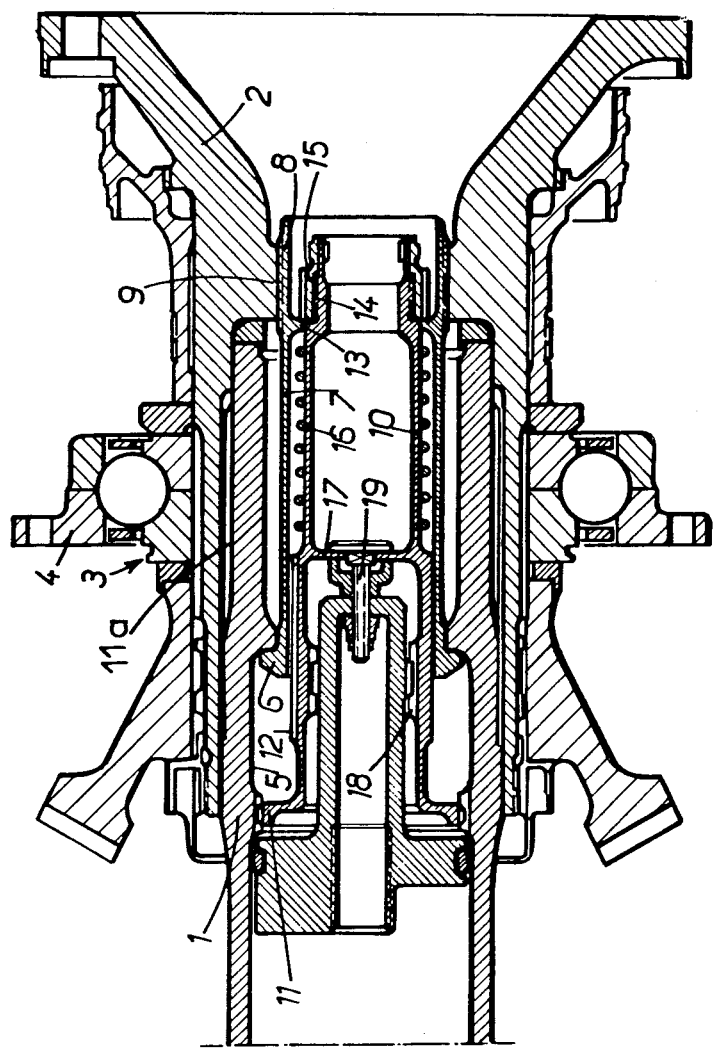
FIG. 1 is a partial sectional view of the part of a jet engine comprised between the low pressure and high pressure compressors in the region of a bearing, the shaft being equipped with a device according to the invention.

FIG. 1 shows a partial view, in section, of one part of a turbojet engine located between the low pressure and the high pressure compressors in the region of the bearing of the rotor shaft. In order to facilitate its assembly, and as is known, the shaft consists of several parts, rendered integral by mechanical means, an example of which is given in the figure.

The end of the part of the shaft 1 to which the low pressure stages are secured directly and indirectly, penetrates in part 2 of the shaft to which the high pressure stages are fastened. The segment 2 of the shaft, in its part in contact with the segment of the shaft, is supported by a bearing 3 consisting of ball bearings, the external races 4 of which are secured to the casing of the turbojet engine. The segments 1 and 2 of the shaft are hollow and the segment 1 of the shaft has a counterbore 5 against which the collar 6 of a packing ring 7 abuts. The threaded end 8 of the packing ring is threaded into internal threads 9 of the shaft segment 2. In order to prevent the rotation of one segment of the shaft in relation to the other, a blocking piece 10 having flutings on its outside, is provided. A first annulus of flutings 11 on blocking piece 10 cooperates with corresponding flutes provided in the bore of the shaft segment 1 and a second annulus of flutes 12 cooperates with flutes provided in the bore of the packing ring 7. The end of the blocking piece 10 is maintained in a bore 13 of the ring 7 and carries a threaded part 14 upon which a ring 15 blocking the piece 10 against the action of a spring 16 within the ring 7, is screwed. Because of the small thickness of the walls of the blocking piece 10, it contains at its approximate mid-length a transverse wall 17. In order to connect the fluting of the blocking piece 10, both with the flutes of the shaft 1 and with those of the packing ring 7, an annulus of flutes 18 is provided in the bore of the blocking piece, wherein a tool is inserted, whereby the threading 8 of the ring may be screwed in or out by a fraction of a turn sufficient to align the flutings of the piece 10 with those of the ring 7 and of the shaft segment 1. The shaft segments 1 and 2 are similarly fastened together by a fluting assembly 11a.

The mode of joining described hereinabove of the low pressure and high pressure segments of the compressor shaft provides a piece (the piece 10), particularly well adapted to constitute a part of the unbalance correcting device according to the invention. The elements of the piece 10 essential to the invention are the transverse wall 17 and the fluted annulus 18.

According to any embodiment of the joining shaft between the low pressure and the high pressure compressors, it must contain, approximately in the region of the bearing and in the bore, a transverse wall and a plurality of peripheral flutes. These two elements may be provided by machining them directly into the shaft, or they may be carried by a piece capable of being joined with the shaft.

According to the invention and as shown at a larger scale in FIG. 2, the transverse wall carries at its center fastening means 19 consisting, for, example, of a gudgeon with a threaded end. Onto this threaded end 20, a balancing piece 21 is placed. According to one embodiment of the invention, the piece consists of a hollow cylindrical body 22 and a head 23 which is at least partially cylindrical. The body has flutes 24 on its exterior surface provided to cooperate with the flutings 18 that are directly or indirectly rigid with the shaft. At the end of the body 21 opposite the head 23, there is a bottom wall 25 carrying complementary fastening means which cooperate with the fastening means 19. The complementary means consist of an orifice with a diameter corresponding to the end of the gudgeon 19 and a screw 27. The head 23 comprises a cylindrical part 28 and an eccentric part 29, traversed by the extension of the bore 31 of the hollow cylindrical part. As shown in FIG. 3, the eccentric part 29 is in the form of a disk, one face whereof is integral with the face of the cylindrical part and the diameter whereof is at least equal to the sum of the radii of the cylindrical part 28 and the bore 31. The cylindrical part and the eccentric part are tangent at a point 30 at their outer edges. According to one possible embodiment of the eccentric part the eccentric part is approximately in the form of a rectangular parallelepid, the small end faces of which have the respective configurations of a cylindrical segment extending the cylindrical face of the cylindrical part 28 and of a cylindrical segment extending the cylindrical face of the bore 31.

According to the embodiment shown in FIG. 2, the fastening means consist of a bolt, the part 32 of which under the head is of a polygonal shape, square, for example, and penetrates into an orifice 33 in the transverse wall 17. The body of the bolt is maintained in place in the wall by a nut 34, which also serves as the support against which the balancing piece 21 is tightened in the manner described hereinabove. The part 28 has a groove 35 engaged by a toroidal gasket 36.

The operation of the device to correct an unbalance is as follows.

The balancing piece 21 is machined so that the head 23 and particularly the eccentric part 29 has a weight as a function of its thickness higher than the unbalance expected. The values and direction of the residual imbalance are determined with the aid of a device according to, for example, French Pat. No. 1,477,752. The excess weight of the eccentric part is then removed by machining (represented by the shaded portion) to bring it to the value of the residual imbalance. The balancing piece 21 is introduced in the shaft 1 and the eccentric part is positioned angularly after preliminary measurements to compensate for the residual imbalance. The flutings of the balancing piece 21 are engaged in the flutings of the bore of the shaft and the piece 21 is held by the screw 27 on the transverse wall 17.

The invention is not limited to the embodiment described hereinabove, which applies to a turbojet engine of the single body type, as it may equally be applied to dual or triple body engines and in such a case, the shaft segment 1 becomes the low pressure shaft of the engine.

What is claimed is:

1. A device to correct the imbalance of a rotor in a turbojet engine wherein the rotor is mounted on a shaft having two segments joined so as to rotate together, the shaft segments defining coaxially aligned bores, a portion of a first shaft segment having a plurality of flutes extending into the bore and a portion of a second shaft segment defining internal threads, the device comprising: (a) a packing ring member disposed in the coaxially aligned bores, the packing ring defining a bore therethrough and engaging the first and second shaft segments so as to retain them in assembled relationship; (b) a blocking piece disposed within the bore in the packing ring and attached to the packing ring, the blocking piece and the packing ring having interengaging flutes to prevent relative rotation between them, the blocking piece defining a bore therethrough with a transverse wall extending across the bore and flutes extending along at least a portion of the bore; (c) a balancing piece having (i) a cylindrical body with flutes along at least a portion of its outer surface, the cylindrical body being disposed with the bore of the blocking piece such that its flutes engage those flutes on the bore of the blocking piece, (ii) a cylindrical part attached to the cylindrical body, the cylindrical part and the cylindrical body being disposed coaxially with bores in the first and second shaft segments, and (iii) an eccentric part attached to the cylindrical part; and, (d) fastening means to attach the cylindrical body of the balancing piece to the transverse wall of the blocking piece such that the circumferential position of the eccentric part may be oriented and fixed in position to offset any imbalance in the rotor and shaft structure.

2. A device to correct an imbalance according to claim 1 wherein the cylindrical body has a bottom wall with an opening therethrough and wherein the fastening means comprises: a threaded gudgeon extending through the transverse wall and the opening in the bottom wall; and complementary threaded screw means threadingly engaging a portion of the grudgeon extending in the cylindrical body.

3. A device to correct an imbalance according to claim 2 wherein the transverse wall defines an opening of polygonal cross-section and wherein the gudgeon comprises a bolt having a portion of complementary polygonal cross-section to enter the polygonal opening and prevent relative rotation between the bolt and the transverse wall, and further comprising nut means threadingly engaging the bolt to retain it in position.

4. A device to correct an imbalance according to claim 3 wherein the nut means serves as a support piece between the transverse wall and the bottom wall of the cylindrical body.

5. A device to correct an imbalance according to claim 2 further comprising a support piece disposed about the gudgeon between the transverse wall and the bottom wall of the cylindrical body.

6. A device to correct an imbalance according to claim 1 wherein the eccentric part is in the form of a rectangular parallelepiped, having curved terminal faces in the configuration of a cylindrical segment extending the cylindrical face of the bore.

7. A device to correct an imbalance according to claim 1 wherein the eccentric part is in the form of a disk, one face of which is integral with the cylindrical part and the periphery of which is internally tangent to the periphery of the cylindrical part.

8. A device to correct an imbalance according to claim 6 or 7, wherein the cylindrical part of the head defines a peripheral groove about its peripheral surface and further comprising a gasket inserted in the groove.

* * * * *

UNITED STATES PATENT AND TRADEMARK OFFICE
CERTIFICATE OF CORRECTION

PATENT NO. : 4,455,887
DATED : June 26, 1984
INVENTOR(S) : LISSAJOUX, et al.

It is certified that error appears in the above-identified patent and that said Letters Patent is hereby corrected as shown below:

Column 1, line 48, change "unbalance" to imbalance.

Column 2, line 44, after "segment" insert therefor --1--.

Signed and Sealed this

Twelfth Day of March 1985

[SEAL]

Attest:

DONALD J. QUIGG

Attesting Officer    Acting Commissioner of Patents and Trademarks